United States Patent [19]

Heckethorn et al.

[11] Patent Number: 4,602,811
[45] Date of Patent: Jul. 29, 1986

[54] U-BOLT CLAMP CONSTRUCTION

[75] Inventors: John E. Heckethorn, Dyersburg; Danny J. Whittle, Newbern, both of Tenn.

[73] Assignee: Heckethorn Manufacturing Company, Dyersburg, Tenn.

[21] Appl. No.: 675,570

[22] Filed: Nov. 28, 1984

[51] Int. Cl.⁴ ............................................. F16L 13/14
[52] U.S. Cl. .................................. 285/382.2; 285/420; 24/277
[58] Field of Search .............. 285/382.2, 420; 24/277, 24/206 W

[56] References Cited

U.S. PATENT DOCUMENTS

| | | | |
|---|---|---|---|
| 2,985,934 | 5/1961 | Daubner | 24/277 |
| 2,993,255 | 7/1961 | Jagiel | 285/420 X |
| 3,919,747 | 11/1975 | Offterdinger | 24/277 |
| 3,955,250 | 5/1976 | Heckethorn | 24/277 |
| 4,147,384 | 4/1979 | Heckethorn | 285/382.2 |
| 4,249,759 | 2/1981 | Heckethorn | 285/382.2 |
| 4,393,559 | 7/1983 | Heckethorn et al. | 24/277 |

*Primary Examiner*—Dave W. Arola
*Attorney, Agent, or Firm*—Dennison, Meserole, Pollack & Scheiner

[57] ABSTRACT

A new open end pipe or tube clamp assembly having an exceptionally high strength-to-size ratio which utilizes a U-bolt and a novel saddle member. The saddle is formed by a progressive die of a single piece with no welding and has a top web surface which is severely formed to define a pair of spaced rounded ridges and a depressed central portion achieving high strength and the ridges also serve as nut seats and reduce galling. The side walls of the saddle are centrally depressed to provide narrow contact with the tubing. When the clamp is tightened about a pipe joint high tension stresses force the side members toward each other.

7 Claims, 17 Drawing Figures

U-BOLT CLAMP CONSTRUCTION

BACKGROUND

Our present invention is in the field of U-bolt saddle clamps used particularly in the automotive field but capable of general utility for securing tubing in telescoped connection. Such devices are frequently employed in vehicle exhaust systems. The clamp of our new invention finds particular utility, but is not limited to, securing the catalytic converter air injection tube.

Almost all prior art clamps of this type include a U-bolt formed from high strength steel rod and include a semi-circular bight portion which integrally connects a pair of generally parallel legs which are normally roll-threaded on their ends and which are received in axially slidable relation within a stamped and welded sheet steel saddle member provided with spaced tubular portions which receive the U-bolt legs. A central web normally extends between the U-bolt leg receiving tubular portions. Nuts are threaded onto the leg ends and are tightened against the tubular portion ends of the saddle member for clamping the telescoped tubes or pipes between the U-bolt bight and the curved inner edge of the saddle member.

Government standards for vehicle exhaust systems have become extremely rigid in the past few years with regard to gas-tightness and mechanical security against separation. As a result stronger and more effective clamp designs have appeared. Examples of such clamps may be found in Heckethorn U.S. Pat. Nos. 4,147,384, 4,249,759, and 4,393,559 (Heckethorn/Whittle).

Due to economic pressures in the automotive industry, a need has arisen to design a very strong yet compact clamp meeting all government requirements which is more economical than presently available clamps and which can be easily manufactured in large quantities.

The new clamp of the present invention will, when tightened over a pipe connection, form a uniform indented bead therein extending 360° about the joint thereby assuring gas tightness and preventing inadvertent disconnection.

OBJECTS OF THE INVENTION

Our present invention has for a principal object the provision of an improved U-bolt clamp useful for interconnecting tubular pipe or tube sections which has an extremely high strength-to-size relationship.

Another object of the invention is to provide a U-bolt clamp having a specially formed upper web surface which enhances the saddle strength and will withstand very high nut torque without galling of the nut face, saddle top surface or collapsing.

It is another object of our invention to provide a U-bolt and saddle construction for telescopic tubing joints wherein the saddle has a pair of spaced apart side walls which, when the clamp is tightened about a joint, will be forced toward each other rather than apart.

Yet another object of the invention is to achieve cost economies in the manufacture utilizing progressive die techniques, minimum material usage and elimination of welding.

Another object of our invention is the provision of a U-bolt saddle clamp which may be manufactured in large quantities at low cost from sheet metal and rod stock, and which is light in weight, easy to form and to install, seals effectively, is mechanically secure, and is simple and safe in use and which can be used to secure a motor vehicle catalytic converter air-injection tube. It may be manufactured in larger sizes for other applications.

Further objects and advantages are within the scope of the present invention and numerous additional details and features will be apparent from a consideration of the following specification and drawings.

DESCRIPTION OF THE DRAWINGS

FIGS. 6–16 show the die progression stages in the clamp saddle manufacture wherein, FIG. 6 shows a steel blank after the first forming.

FIG. 7 is a view of the blank of FIG. 6 after the outer edges are trimmed.

FIG. 8 shows the blank after the subsequent step of blanking the radii.

FIG. 9 shows the blank of FIG. 8 after the edges of the radii have been coined.

FIG. 10 shows the first 45° bending step.

FIG. 11 is a cross-sectional view taken along line 11—11 of FIG. 10.

FIG. 12 is a view of the blank after the second bending step.

FIG. 13 is a sectional view taken along line 13—13 of FIG. 12.

FIG. 14 is a subsequent view of the formed blank after bolt holes have been blanked.

FIG. 15 is a view of the formed blank from the side opposite to FIG. 14 showing the forming of the depression in the upper surface of the saddle.

FIG. 16 is a sectional view of the formed blank taken along line 16—16 of FIG. 15.

DETAILED DESCRIPTION

Figure 1:
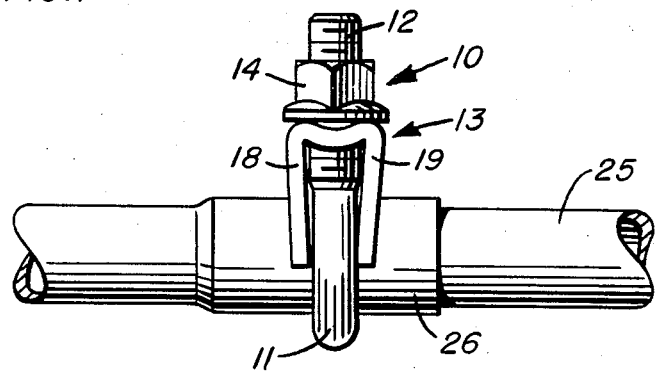
FIG. 1 is a side elevation of the clamp of our present invention shown tightened and installed on a coupled section of pipe.

Our invention is a composite assembly of only four parts which comprise the U-bolt clamp shown generally at 10. This assembly consists of a high-strength U-bolt 11 formed from steel rod and roll-threaded on each end as at 12; a specially formed steel member 13; and a pair of flange nuts 14 which are threaded onto the U-bolt ends.

The saddle member 13 is stamped from a single piece of sheet stock as later described and has a top web surface 15 which is deformed inwardly at its center line to increase rigidity and to provide a pair of rounded ridges 16, 17 which act as seats for the nuts 14. A pair of side members 18 and 19 depend downwardly from web surface 15. It will of course be understood that the saddle member 13 is slidable axially on the legs of U-bolt 11 between the securing nuts 14 and the bight of the U-bolt. The nuts 14 are preferably formed with an integral flange 20 in order to distribute the load over a larger area.

Figure 2:
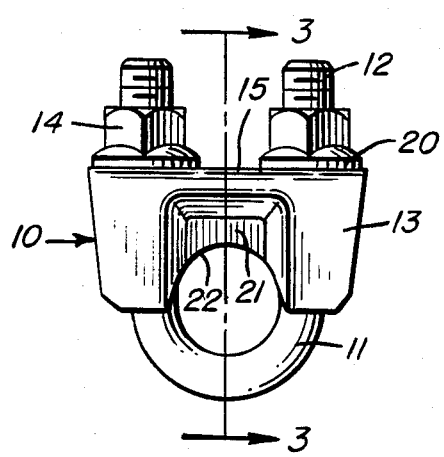
FIG. 2 is a view of the clamp of FIG. 1 with the pipe removed.
Figure 3:
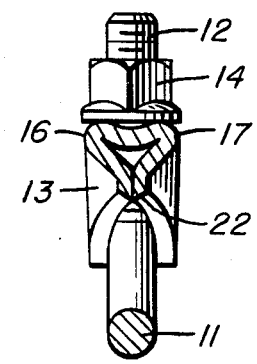
FIG. 3 is a vertical cross-section taken along the line 3—3 of FIG. 2.
Figure 4:
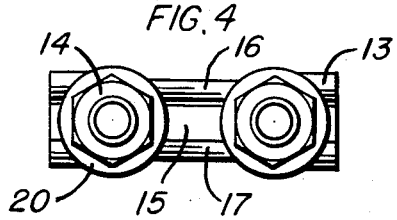
FIG. 4 is a top view of the clamp of FIG. 2.
Figure 5:
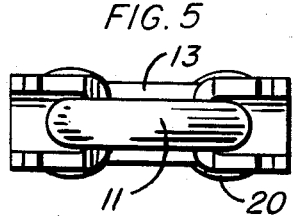
FIG. 5 is a bottom view of the clamp of FIG. 2.

In FIGS. 2 and 3, it will be noted that the side members 18 and 19 are indented in their center portions as at 21 so that they are in face-to-face contact to form a pipe engaging circular edge 22. The indentation slopes gradually to the planar side walls to provide a generally triangular cross-section as seen best in FIG. 3.

In operation, a coupling of telescoped tubular pipe members such as shown at 25 and 26 in FIG. 1 is compressed between saddle 13 and the bight portion of U-bolt 11 when the saddle is moved toward the bight portion due to tightening of the nuts 14 as they draw down on the threaded bolt ends 12. Since the upper web surface 15 is not flat but is defined by the two rounded ridges 16 and 17, the nuts will glide over them as seats without galling, even under high torque. This configuration employing the ridges results in optimum rigidity and strength and will withstand higher nut tension than prior designs. Test results on a split mandrel disclose that saddles utilizing the depressed top web construction of this invention exhibit about 1000 lbs more compression than saddles made in accordance with Heckethorn, U.S. Pat. No. 4,249,759, without failure. Tests to destruction showed little or no galling even when the nuts were torqued until the U-bolt failed.

The saddle of course contacts the tubing on a centerline common with the U-bolt, so that a uniform locking bead is formed all of the way around the entire circumference of the tubing as required in certain applications.

As previously indicated herein, the side members tend to draw together during nut tightening contrary to operation of prior art open end devices where there is a tendency for the side members to spread apart and separate. Our open end construction requires no welding during manufacture.

FORMING OF THE SADDLE

The saddle member 13 of our invention can be fabricated of any suitable material dependent on its application but is preferably formed of a low carbon high strength steel. Utilization of progressive die techniques provides many advantages including low cost, high volume production and precise tolerances.

Figure 17:
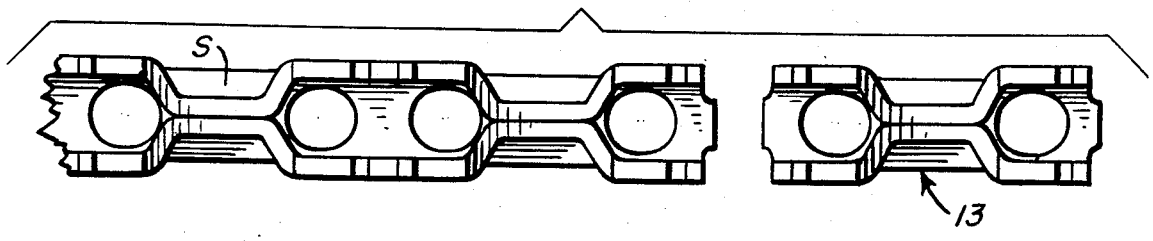
FIG. 17 is a top view of a strip of formed blanks showing a completed saddle member cut therefrom.

Specific attention is directed to sheet 2 of the drawings and to FIG. 17 on sheet 1. Blanking, forming and bending of the saddle can be accomplished in nine steps or stages utilizing a progressive die although the exact number of stages is not critical with respect to the invention.

The strip S from which the saddle is formed may be fed to the progressive die apparatus from a roll. While, except for FIG. 17, only one saddle blank is shown, it will be understood that a plurality of blanks are formed on each strip and severing of individual saddles 13 occurs only after total saddle forming. Each segment or blank is subjected to blanking and forming steps incorporated in the progressive die.

Figure 6:
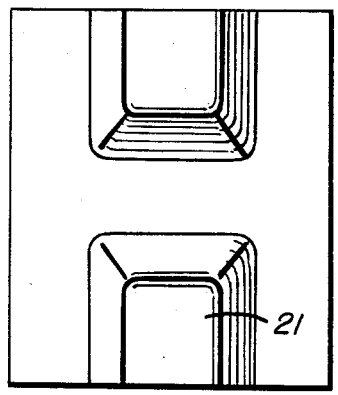
Figure 7:
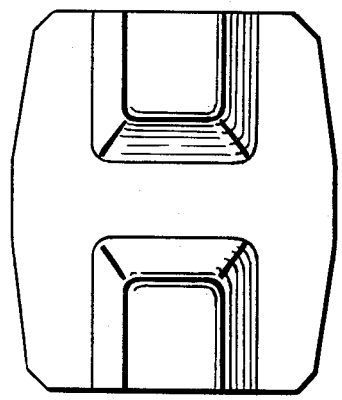
Figure 8:
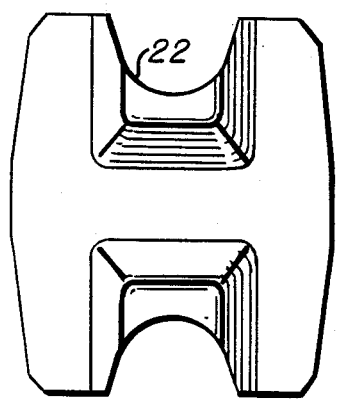
Figure 9:
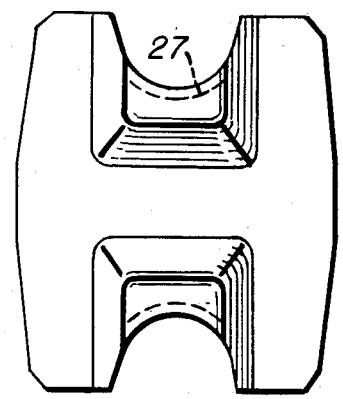

The first step as shown in FIG. 6 is the first forming where the central indentation 21 is impressed. The outer edges of each blank are next trimmed to the configuration of FIG. 7. The saddle radii to provide the pipe engaging edge 22 are blanked by the die in FIG. 8. This is followed by the step of coining the radii as shown by the lines 27 in FIG. 9.

Figure 10:
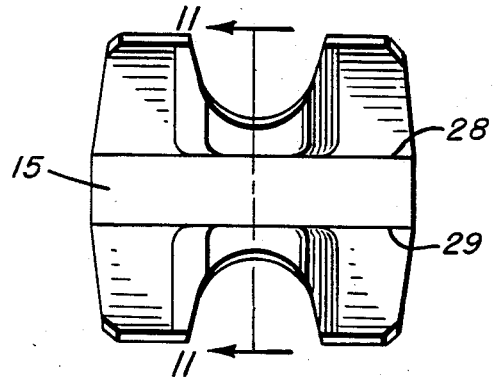
Figure 11:
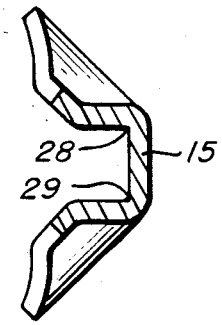
Figure 12:
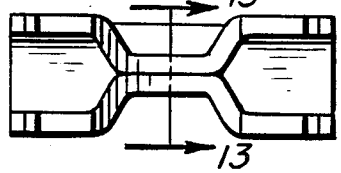
Figure 13:

The blank is subjected to the first bending operation as shown in FIG. 10. Here each side is bent upwardly 45° about the lines 28 and 29 to achieve the FIG. 11 cross-section. Thereafter a second 45° bending occurs in the FIGS. 12 and 13 configuration.

Figure 14:
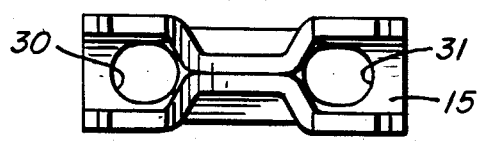
Figure 15:
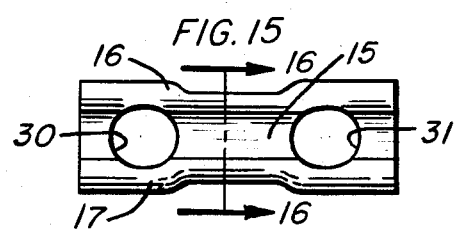

A pair of spaced bolt holes 30 and 31 are blanked in the upper web surface 15, shown in FIG. 14.

Figure 16:

The very important steps of forming the depression in the upper web surface 15 to provide the ridges 16 and 17 then takes place. This is achieved by application of pressure on the entire lower edges of side members 18 and 19. The final cross sectional shape of FIG. 16 is thus achieved and the inside radii are brought into perfect alignment.

Finally, the finished saddle 13 is cut from the strip as in FIG. 17. All of this forming takes place with only a single press stroke and no welding at all.

It is also contemplated that other progressions within the die will stamp the saddle member with appropriate part numbers and logos.

We claim:

1. In a U-bolt clamp comprising a U-bolt having threaded end portions, a saddle body having bolt receiving openings, said saddle body being movable on said U-bolt, and nut means threaded on said end portions and acting against said saddle body to secure a pair of telescoped pipe ends therebetween; and improvement comprising, said saddle body formed from a single folded blank of sheet metal and including a top web surface and a pair of side members having ends depending therefrom, the side members having an idented center section extending substantially from one bolt receiving opening to the other and having an arcuate lower edge to engage a pipe surface, said top web surface having said bolt receiving openings therein and being deformed inwardly and centrally along its entire length during manufacture to define a pair of spaced rounded ridges on either side of the deformation, said ridges serving as seats for said nut means to lessen frictional resistance against said nut means during the tightening thereof, and also serving as hinge points for movement of said side members toward each other upon application of tightening pressure exerted by the nut means against said rounded ridges.

2. A U-bolt clamp as defined in claim 1, wherein the saddle body is open at its ends.

3. A U-bolt clamp as defined in claim 1, wherein said saddle side members are deformed during manufacture inwardly and into contact with each other forming said indented center section between the bolt receiving openings and below the top web surface.

4. A U-bolt clamp as defined in claim 1, wherein said arcuate lower edge is coined to provide a reduced contact area for engaging the pipe surface.

5. A U-bolt clamp as defined in claim 4, wherein said ridges are spaced outwardly of said reduced contact area.

6. A U-bolt clamp as defined in claim 1, wherein the saddle body is blanked and formed with a progressive die.

7. A U-bolt clamp as defined in claim 1, wherein the arcuate lower edge of said saddle body and the bight portion of said U-bolt define a substantially true circle when said clamp is fully tightened about said telescoped pipe ends.

* * * * *